UNITED STATES PATENT OFFICE.

FREDERICK DAVIS, OF WISWELL, NEAR WHALLEY, ENGLAND, ASSIGNOR TO FARBEN-FABRIKEN VORM. FRIEDR. BAYER & CO., OF ELBERFELD, GERMANY, A CORPORATION OF GERMANY.

PROCESS OF CALICO-PRINTING.

984,545.  Specification of Letters Patent.  Patented Feb. 21, 1911.

No Drawing.  Application filed July 28, 1909. Serial No. 510,142.

*To all whom it may concern:*

Be it known that I, FREDERICK DAVIS, citizen of the British Empire, residing at Wiswell, near Whalley, England, have invented new and useful Improvements in Processes of Calico-Printing, of which the following is a specification.

This invention relates to improvements in calico printing and has for its object to produce certain novel colored resist effects in printing indigo and other vat colors.

In carrying my invention into effect I may or may not prepare the cloth with glucose in the ordinary way for indigo printing. I then print with a resist paste containing sulfur, such as is ordinarily used for producing a white resist effect under printed indigo, to which I add a sulfur color, or a suitable vat dyestuff, or mixture of the same. I then print, pad or otherwise cover with any suitable indigo printing color, for instance the customary color containing indigo and caustic alkali when the cloth is prepared with glucose, or the customary color containing indigo, caustic alkali and a suitable hydrosulfite when the cloth is not so prepared, or with similar printing colors prepared from other vat dyes, or mixtures thereof, the final result after development in either case being that where the sulfur resist is printed the fixation of indigo blue or other printing color is prevented, while where the printing color falls upon the sulfur resist color the coloring matter contained in the latter is fixed upon the fiber. This novel and useful effect is, I believe, due to the combination of two well known effects—the resisting action of sulfur on indigo, or other printing color, and the fixation of sulfur colors by the simultaneous action of alkali and sulfur under suitable conditions, the fixation being presumably due to the intermediate formation of alkali sulfids.

If it is desired to fix the sulfur or other color as above indicated all over the surface of the resist print, even where the printing color does not fall upon it, I add a suitable alkali, such as carbonate of potash or soda, to the sulfur resist color mixture. I then age or steam, wash and otherwise treat the cloth in the usual way.

The dyestuffs which can be applied for the purpose of my invention may be divided into two classes—resist dyes and cover dyes. The resist dyes are characterized by the fact that they are capable of fixation by the simultaneous action of sulfur and alkali. The cover dyes are characterized by the fact that they are sufficiently resisted by sulfur to permit of obtaining good colored resist effects by my process. For that purpose it is not necessary that they should be resisted completely.

I have found that all the so-called "vat" colors, more particularly the indanthrene, algol and ciba colors, also the thionaphthene colors, are suitable as cover colors and can be used in my process in place of indigo in the cover and as resist dyes I may employ especially the sulfur-colors, such as katigen green, katigen blue, katigen olive, etc., the algol-colors, particularly algol green and algol blue, the indigo-colors, especially the thio indigoes and bromin derivatives etc.; the difference between cover and resist dyes in my process being that the latter must be capable of fixation by the simultaneous action of sulfur and alkali, while practically all vat colors are available as cover dyes.

I claim:

1. In the art of producing variegated colored effects by means of vat dyestuffs, the process consisting of first printing resists on the fabric which comprise sulfur, sulfur colors and a suitable alkali, then covering the fiber with suitable vat dyes and finally finishing the goods in the usual manner, substantially as described.

2. In the art of producing variegated colored effects by means of vat dyestuffs the process consisting of first printing resists on the fabric which comprise sulfur, sulfur colors, vat dyestuffs and a suitable alkali, then covering the fiber with suitable vat dyes and finally finishing the goods in the usual manner, substantially as described.

In testimony whereof I have hereunto set my hand in the presence of two subscribing witnesses.

FREDERICK DAVIS.

Witnesses:
WILLIAM HENRY JAMES WINSTANLEY,
ERNALD SIMPSON MOSELEY.